(12) United States Patent
Todd

(10) Patent No.: US 10,924,361 B2
(45) Date of Patent: Feb. 16, 2021

(54) DECENTRALIZED DATA ANALYTICS MANAGEMENT

(71) Applicant: EMC IP Holding Company LLC, Hopkinton, MA (US)

(72) Inventor: Stephen J. Todd, Center Conway, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/369,032

(22) Filed: Mar. 29, 2019

(65) Prior Publication Data

US 2020/0313982 A1    Oct. 1, 2020

(51) Int. Cl.
| | |
|---|---|
| *G06F 15/16* | (2006.01) |
| *H04L 12/24* | (2006.01) |
| *G06F 16/901* | (2019.01) |
| *H04L 29/08* | (2006.01) |

(52) U.S. Cl.
CPC ...... *H04L 41/5045* (2013.01); *G06F 16/9024* (2019.01); *H04L 41/5051* (2013.01); *H04L 67/2838* (2013.01)

(58) Field of Classification Search
CPC .................................................. H04L 41/5045
USPC ......................................................... 709/223
See application file for complete search history.

(56) References Cited

U.S. PATENT DOCUMENTS

| | | | | |
|---|---|---|---|---|
| 9,356,961 | B1 * | 5/2016 | Todd ................... | H04L 63/1441 |
| 2013/0117157 | A1 * | 5/2013 | Iyoob .................... | G06Q 30/06 |
| | | | | 705/26.41 |
| 2014/0156727 | A1 * | 6/2014 | Almon .............. | H04L 29/08072 |
| | | | | 709/203 |
| 2014/0324503 | A1 * | 10/2014 | Whittaker .............. | G06Q 50/01 |
| | | | | 705/7.19 |
| 2016/0093009 | A1 * | 3/2016 | Goldklang ........... | G06Q 50/188 |
| | | | | 705/80 |
| 2016/0335585 | A1 * | 11/2016 | Suh ..................... | G06Q 30/0635 |
| 2018/0012151 | A1 * | 1/2018 | Wang ................. | G06Q 10/0639 |
| 2018/0107760 | A1 * | 4/2018 | Saha ................. | G06F 16/24554 |
| 2019/0122760 | A1 * | 4/2019 | Wang ..................... | G06Q 10/02 |
| 2019/0236577 | A1 * | 8/2019 | Schmid ................ | G06Q 20/108 |
| 2019/0340269 | A1 * | 11/2019 | Biernat ................. | G06F 16/248 |

(Continued)

OTHER PUBLICATIONS

Satoshi Nakamoto, "Bitcoin: A Peer-to-Peer Electronic Cash System," http://bitcoin.org/bitcoin.pdf, 2008, 9 pages.

(Continued)

*Primary Examiner* — Hamza N Algibhah
(74) *Attorney, Agent, or Firm* — Ryan, Mason & Lewis, LLP

(57) ABSTRACT

Decentralized data analytics management is provided. For example, a method comprises the following steps. An analytic request is generated. The analytic request specifies one or more data sets and at least one analytic algorithm to be executed on the one or more data sets, wherein the one or more data sets and the at least one analytic algorithm are hosted on a set of clouds. The analytic request is published to the set of clouds to initiate negotiation with at least a portion of the set of clouds to determine a set of terms for execution of the at least one analytic algorithm on the one or more data sets. Execution of the at least one analytic algorithm on the one or more data sets can proceed as per the negotiated set of terms.

20 Claims, 10 Drawing Sheets

(56) References Cited

U.S. PATENT DOCUMENTS

2020/0019865 A1\* 1/2020 Wang .................. H04L 9/085
2020/0162473 A1\* 5/2020 Mercuri ............... H04L 63/102

OTHER PUBLICATIONS

U.S. Appl. No. 15/797,564 filed in the name of Stephen Todd et al. Oct. 30, 2017 and entitled "Graphical Representation of Application Deployment and/or Execution in Multi-Cloud Computing Environment."

U.S. Appl. No. 15/496,464, filed in the name of Stephen Todd et al. Apr. 25, 2017 and entitled "Distributed Ledger for Peer-to-Peer Cloud Data Asset Valuation."

\* cited by examiner

DECENTRALIZED DATA ANALYTICS MANAGEMENT

FIELD

The field relates generally to information processing systems, and more particularly to information processing systems comprising cloud infrastructure.

BACKGROUND

The trend in information processing systems for enterprises today is data decentralization. Data decentralization is when data inputs and analytic algorithms are spread out geographically. Information processing systems commonly implement a cloud computing paradigm to accommodate data decentralization. Cloud computing is a model for enabling on-demand network access to a shared pool of configurable computing resources (e.g., compute, storage, input/output, and network) that can be rapidly provisioned and released with minimal management effort or service provider interaction. A given cloud infrastructure upon which data and one or more software programs (e.g., applications, services) are hosted is typically referred to as a "cloud." A "multi-cloud" architecture is one that employs multiple clouds in a single heterogeneous network architecture. Some cloud infrastructures are within the exclusive control and management of a given enterprise, and therefore are considered "private clouds." The term "enterprise" as used herein is intended to be broadly construed, and may comprise, for example, a business or any other entity, group, or organization. On the other hand, cloud infrastructures that are used by multiple enterprises, and not necessarily controlled or managed by any of the multiple enterprises but rather are respectively controlled and managed by third-party cloud providers, are typically considered "public clouds." Examples of available public cloud infrastructures include, but are not limited to, Amazon Elastic Compute Cloud®, Google AppEngine®, and Windows Azure® Services Platform.

However, managing different aspects of an information processing system that supports data decentralization can present challenges for data owners, data analytic algorithm owners, and/or data consumers.

SUMMARY

Illustrative embodiments provide decentralized data analytics management.

In one embodiment, a method comprises the following steps. An analytic request is generated. The analytic request specifies one or more data sets and at least one analytic algorithm to be executed on the one or more data sets, wherein the one or more data sets and the at least one analytic algorithm are hosted on a set of clouds. The analytic request is published to the set of clouds to initiate negotiation with at least a portion of the set of clouds to determine a set of terms for execution of the at least one analytic algorithm on the one or more data sets. The steps are performed by at least one processing device operatively coupled to the set of clouds, wherein the at least one processing device comprises a processor operatively coupled to a memory.

In another embodiment, a method comprises the following steps. An analytic request is obtained at a given cloud node in a set of clouds from a requesting processing device. The analytic request specifies one or more data sets and at least one analytic algorithm to be executed on the one or more data sets, and wherein the one or more data sets and the at least one analytic algorithm are hosted on the set of clouds. A negotiation is performed with one or more other cloud nodes in the set of clouds to determine a set of terms for execution of the at least one analytic algorithm on the one or more data sets. A set of program code representing an agreement is sent from the given cloud node to the requesting processing device, wherein the set of program code specifies the set of terms for execution of the at least one analytic algorithm on the one or more data sets. The steps are performed by at least one processing device of the given cloud node, wherein the at least one processing device comprises a processor operatively coupled to a memory.

Advantageously, illustrative embodiments provide a decentralized protocol for negotiating execution of multi-party data transactions.

These and other illustrative embodiments described herein include, without limitation, methods, apparatus, systems, and articles of manufacture comprising processor-readable storage media.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, multiple data centers wherein each data center includes a cloud infrastructure hosting multiple tenants that share cloud resources. Such systems are considered examples of what are more generally referred to herein as cloud computing environments.

Figure 1:
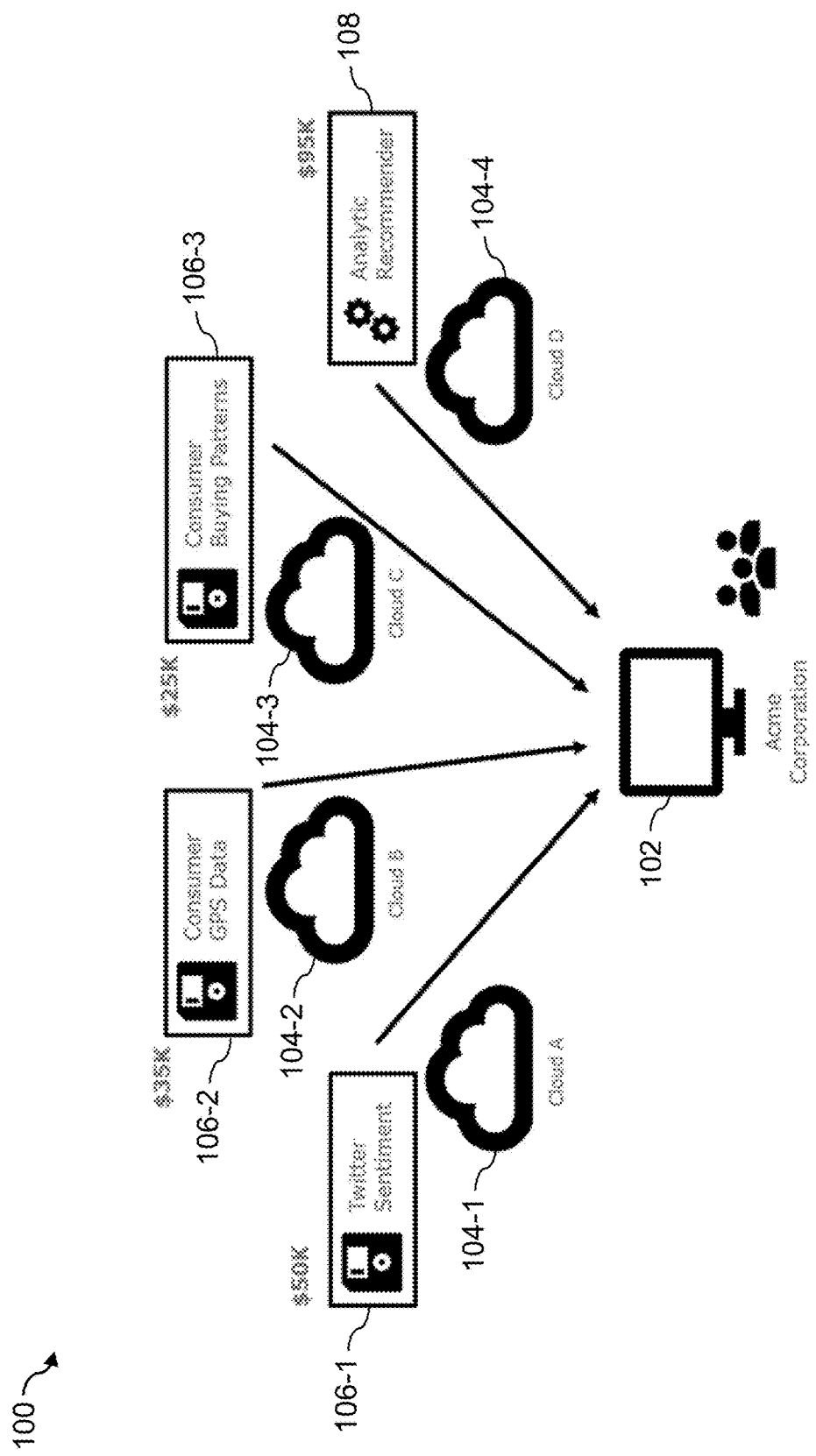
FIG. 1 illustrates an information processing system leveraging decentralized data of an enterprise according to an illustrative embodiment.

It is realized herein that as data becomes an asset that increasingly impacts businesses, financially, operationally, technically, or otherwise, the decentralization of such data continues to present challenges. FIG. 1 illustrates an information processing system leveraging decentralized data of an enterprise in a multi-cloud scenario that illustrates some of the challenges.

FIG. 1 shows an information processing system 100 comprising a computing system 102 operatively coupled to a plurality of clouds 104-1, 104-2, 104-3 and 104-4. Note that such a multi-cloud architecture, in alternative embodiments, can have a greater number or a fewer number of clouds than what is depicted in FIG. 1. Also, as illustratively used herein, when referring to a cloud performing a particular action herein, it is understood that the action is performed by at least one "cloud node" that is part of the particular infrastructure (configurable computing resources) of that cloud.

It is assumed that the computing system 102 is associated with a given enterprise (e.g., Acme Corporation). Each of the plurality of clouds 104-1, 104-2, 104-3 and 104-4 in this embodiment can be private clouds (e.g., associated with the enterprise), public clouds, or a combination thereof. The clouds have respective sets of cloud resources, such as compute, storage, input/output and network resources, in various configurations. For example, the enterprise (associated with computing system 102) may host its data, applications, and/or services on such a multi-cloud architecture. The clouds may interact with one another over one or more communications networks that are not explicitly shown.

Assume, in this example, that the enterprise is a business with customers (consumers) and it seeks to run an analytic recommender algorithm (i.e., analytic algorithm or data analytics) that uses three different data sets as input. More particularly, as shown in FIG. 1, these data sets include data set 106-1 stored on cloud 104-1 (Cloud A), data set 106-2 stored on cloud 104-2 (Cloud B), and data set 106-3 stored on cloud 104-3 (Cloud C). Data set 106-1 in this example represents data pertaining to social media (e.g., Twitter) sentiment. Data set 106-2 in this example represents data pertaining to consumer global positioning system (GPS) information. Data set 106-3 in this example represents data pertaining to consumer buying patterns. Analytic recommender algorithm 108 is hosted on cloud 104-4 (Cloud D).

Further assume that the enterprise has determined that if analytic recommender algorithm 108 leverages information in data sets 106-1, 106-2 and 106-3 from Clouds A, B, and C, respectively, a value of $500K in additional revenue will be realized by the enterprise over a 3-month period. For example, analytic recommender algorithm 108, in some embodiments, takes social media sentiment (data set 106-1), consumer GPS information (data set 106-2), and consumer buying patterns (data set 106-3), analyzes the data, and generates one or more business recommendations for increasing revenue. By way of example only, algorithm 108 can output a recommendation that the enterprise offer a new product that is trending on social media to a geographically-specific set of customers likely to purchase it based on their past buying patterns. Thus, while the data sets 106-1, 106-2 and 106-3 and the analytic recommender algorithm 108 each have some separate value to an enterprise (as shown in FIG. 1, $50K, $35K, $25K and $95K, respectively), the combination of the data sets and algorithm in an analytic transaction could yield a value greater ($500K) than simply the sum of the parts ($205K).

However, in order for the enterprise (via computing system 102) to access the output (recommendation) of analytic recommender algorithm 108, significant challenges in the orchestration of the analytic transaction must be overcome. That is, it is realized herein that combining various assets distributed across multiple clouds (e.g., combining data sets and analytic algorithms to realize added value) presents difficulty in existing computing environments.

Techniques for valuation across a multi-cloud architecture have been proposed. U.S. patent application Ser. No. 15/496, 464, filed Apr. 25, 2017, entitled "Distributed Ledger for Peer-to-Peer Cloud Data Asset Valuation," the disclosure of which is incorporated herein in its entirety, describes methods for multiple providers to share the value of their data across multiple clouds. More particularly, methodologies and systems are described that provide peer-to-peer cloud asset valuation with a distributed ledger (e.g., a valuation blockchain).

A blockchain is a secure, immutable distributed ledger that runs in a peer-to-peer distributed fashion. A distributed ledger in some embodiments is implemented at least in part in the form of a distributed database across a network that maintains a continuously-growing list of records more generally referred to herein as "blocks." Each block illustratively contains a timestamp and a link to a previous block. The blocks are generated using cryptographic techniques in order to allow each participant on the network to manipulate the blocks in a secure way without the need for a central authority.

For example, valuation transactions are entered as corresponding respective blocks into the distributed blockchain ledger, with each block referencing the previous block and being secured from tampering and revision through the use of designated cryptographic techniques. A given block is added to the blockchain distributed ledger only after successful cryptographic verification.

The blockchain distributed ledger is illustratively configured to provide transparency and immutability of valuation transactions in that changes to the blockchain distributed ledger are viewable by all permissioned participants and the corresponding transactions cannot be altered or deleted. Overhead costs are significantly reduced in these and other illustrative embodiments by eliminating the need for a centralized authority or other similar third-party intermediary.

One or more cryptographic block techniques adapted from bitcoin implementations may be employed in some embodiments. In bitcoin, the blockchain contains a record of all previous transactions that have occurred in the bitcoin network. The growth in popularity and usage of electronic cash systems such as bitcoin is in large part due to the underlying blockchain protocol, which allows for two parties in a computer network to transact directly with each other without a trusted third party. The bitcoin system was first described in S. Nakamoto, "Bitcoin: A Peer to Peer Electronic Cash System," 2008, the disclosure of which is incorporated by reference herein in its entirety.

Figure 2:
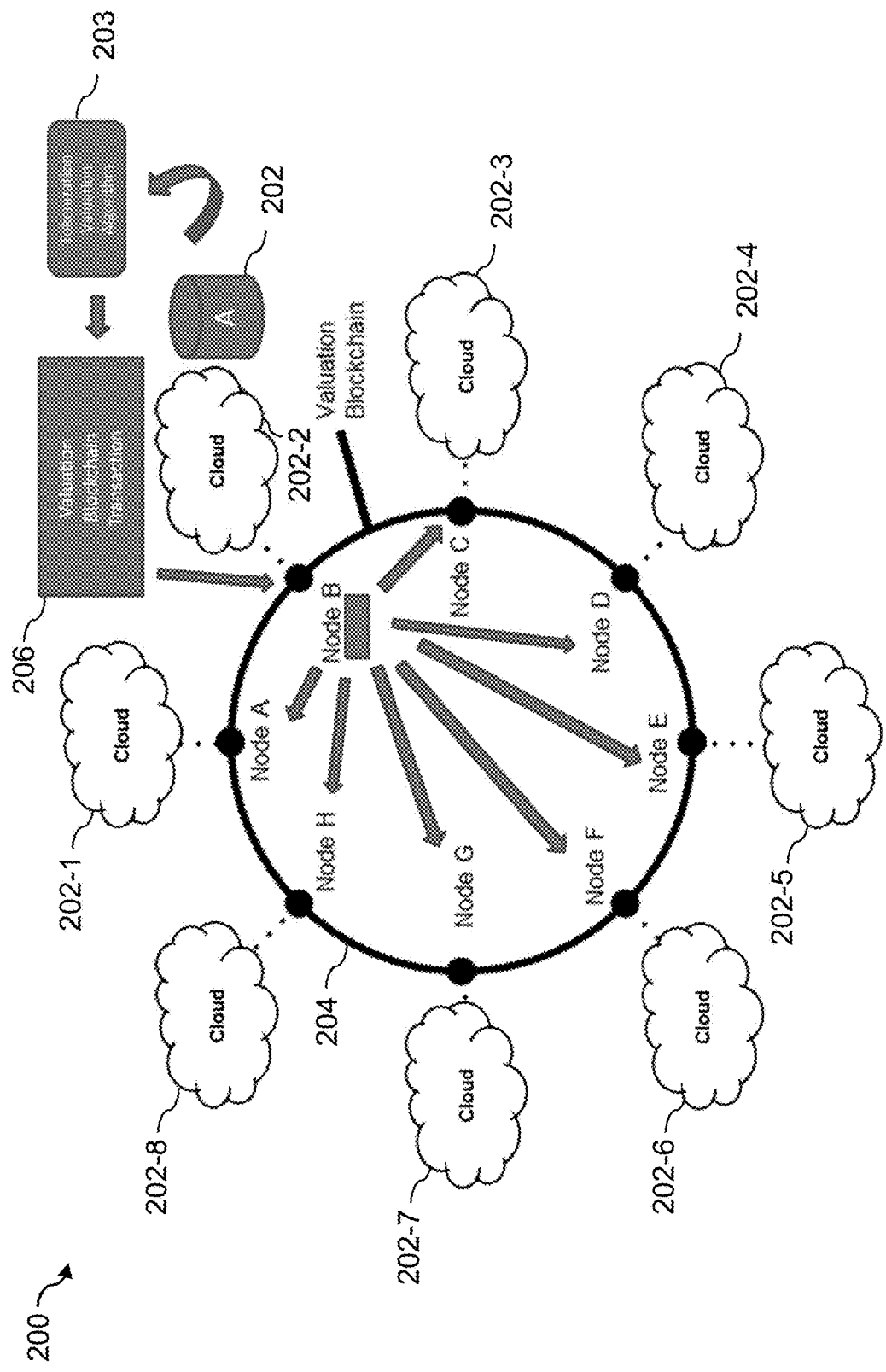
FIG. 2 illustrates an information processing system comprising a distributed ledger for peer-to-peer cloud data asset valuation according to an illustrative embodiment.

By way of example, FIG. 2 illustrates an information processing system 200 comprising a distributed ledger for peer-to-peer cloud data asset valuation. As depicted, a data set 202 (data set A) stored in cloud 202-2 is analyzed by a valuation algorithm 203 (e.g., an unstructured tokenization algorithm) to create an initial value. A first step in this illustrative process is to assign a unique identifier (ID) to the data asset (data set A). This may be generated through any number of methods including, but not limited to, cryptographic hash, random ID generation, or a decentralized identifier assignment algorithm. A valuation blockchain transaction 206 is then created, e.g., data set A with unique ID is being initialized into the blockchain distributed ledger 204 with a given valuation. This valuation blockchain transaction 206 is provided to the local valuation blockchain node (node B). The blockchain protocol then broadcasts this transaction throughout the network to all associated permissioned valuation blockchain nodes (e.g., from node B to the other nodes A and C-H), and all nodes go through the process of eventually recording the transaction in the ledger as a cryptographically generated block characterizing at least the subject transaction. In some cases, a cryptographic block contains more than one valuation transaction. Note that each one of blockchain nodes A through H correspond to a respective one of clouds 202-1 through 202-8 in FIG. 2

Thus, as shown, a cloud provider (associated with cloud 202-2) uses valuation algorithm 203 to calculate the value of data set 202. The cloud provider then connects to valuation blockchain 204 (via node B) to advertise the value of the data set by creating a valuation blockchain transaction 206. This allows all clouds to see the advertised value of multiple data assets across multiple clouds.

Figure 3:
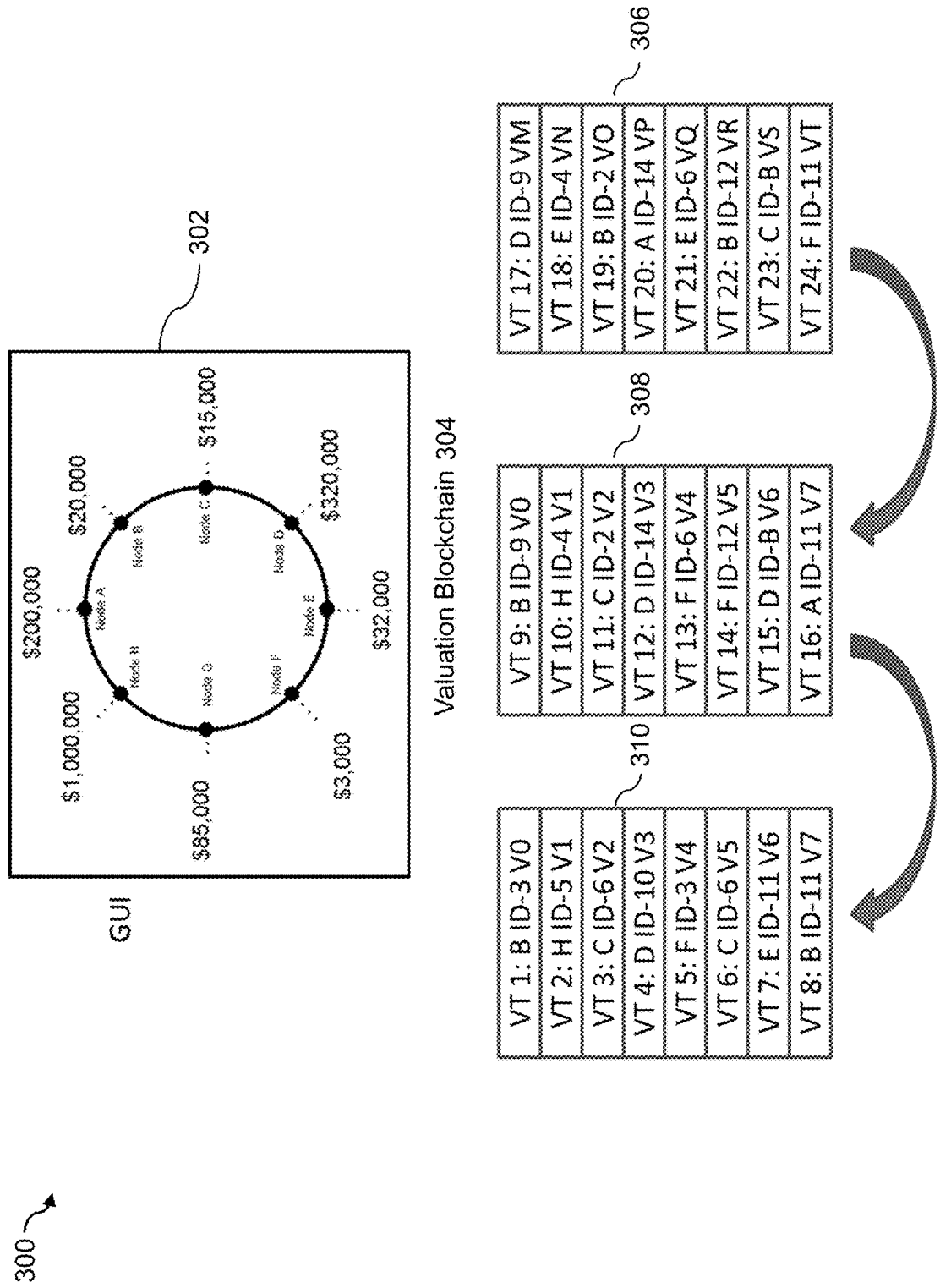
FIG. 3 illustrates a multi-cloud data asset valuation interface according to an illustrative embodiment.

Such a distributed ledger for peer-to-peer cloud data asset valuation as illustrated in FIG. 2 enables each transaction blockchain node (A through H) in the multi-cloud deployment to store an identical, common view of the value of every multi-cloud data asset that has been entered into the ledger 204. A portfolio view of all assets can be achieved by simply "walking" (traversing) the ledger that is available on any node in the network. FIG. 3 illustrates an example 300 of a graphical user interface (GUI) 302 that calls valuation blockchain walker logic via a valuation blockchain ledger 304 (corresponding to ledger 204 in FIG. 2). The blockchain in FIG. 3 represents a series of valuation transactions that have been grouped into blocks 306, 308, and 310, with the areas on the bottom of each block providing the links (e.g., pointers) that allow a walking algorithm to scan through all transactions (i.e., go from block to block). Advantageously, GUI 302 provides a visualization of a value representation of all data from every node using, for example, an economic value of information (EVI) approach to list the value in dollars. Note that, in illustrative embodiments, the transactions in the distributed ledger 304 have fields within them, such as:

VT<N>: where "N" indicates that this is the "Nth" transaction in the overall ledger;

<letter>: indicates the blockchain valuation node that originated the transaction;

ID-<x>: indicates the unique ID of the data asset being valued; and

V<y>: indicates the value assigned to the data asset.

Thus, each entry in blocks 306, 308, and 310 is represented via the above-defined fields (e.g., VT 8: B ID-11 V7).

In addition to generating a singular graphical view (302) of data asset valuation across a multi-cloud deployment, in one or more embodiments, multi-cloud business logic is executed on one or more valuation blockchain nodes (one or more of blockchain nodes A through H) in the network to take action based on changes in value that are recorded by any node into the blockchain distributed ledger 304.

Accordingly, while 24 valuation entries (across blocks 306, 308, and 310) have been created across multiple clouds, the overall value possessed by each cloud is highlighted in the GUI 302 ($200,000 at node A, $20,000 at node B, $15,000 at node C, etc.). Thus, a business owner (e.g., Acme corporation in FIG. 1) can discover these assets (and their value) and may wish to combine them to create even more value. For example, recall as shown in FIG. 1, these assets may be multiple data sets (106-1, 106-2, and 106-3) and an analytic algorithm (analytic recommender algorithm 108) that are combined to generate more value. However, it is realized herein that combining such multiple assets is difficult for a number of reasons which will now be discussed.

Assume the enterprise (e.g., Acme corporation) referred to above in the context of FIG. 1 does not own one or more of data sets 106-1, 106-2, and 106-3. If the enterprise does not want to directly purchase any or all of the data sets, but only wants to input them into analytic recommender algorithm 108, then the purchase of those individual assets represents too much of a price to pay (especially when ownership of the assets is not a goal).

Furthermore, the enterprise may not have the information technology (IT) environment (e.g., the storage resources, or the network bandwidth) required to transfer and/or store input data sets.

In addition to the data sets, the decision to purchase an analytic algorithm may not be desirable for an enterprise. Reasons may include financial (e.g., lack of desire to pay the full value of the analytic algorithm) and/or constraint-related (the e.g., the enterprise does not have the compute resources or IT environment to run the algorithm).

Instead of purchasing data assets and/or analytic algorithms directly, there is currently no mechanism for an enterprise to negotiate one price (at a reduced rate as opposed to directly purchasing all assets) for paying a service provider to run the algorithm on the given data sets and produce the end result.

Even with a mechanism for multi-party agreements to produce decentralized analytic results, the data owners must trust the runner of the analytic algorithm (analytic provider) that the data will not be kept and/or used by the analytic provider for other purposes.

Even with an analytic provider having the capability to provide an analytic result as a service as part of a multi-party negotiation, there is currently no mechanism to prove to the seller that the analytic algorithm has been run as per a multi-party agreement.

Illustrative embodiments overcome the above and other challenges by providing a decentralized protocol for negotiating execution of multi-party data transactions. In one or more illustrative embodiments, an output of the protocol is a smart contract that all parties agree to and validate onto a blockchain. A smart contract is a self-executing agreement with the terms of the agreement between contracting parties (e.g., buyer and seller) being directly written into lines of software program code. In illustrative embodiments, the code and the term agreements contained therein exist across a blockchain distributed ledger (e.g., 204 in FIG. 2).

According to one or more illustrative embodiments, an enterprise (e.g., Acme corporation via a corresponding computing system) can now discover valuable data assets and analytic algorithms using any number of techniques (e.g., browsing the blockchain view depicted in FIG. 3). Once the enterprise has decided that it wants to leverage certain multi-cloud data and an analytic recommender, the enterprise (through its corresponding computing system) can begin negotiating a price with multiple parties using techniques, according to illustrative embodiments, as further described below.

Figure 4:
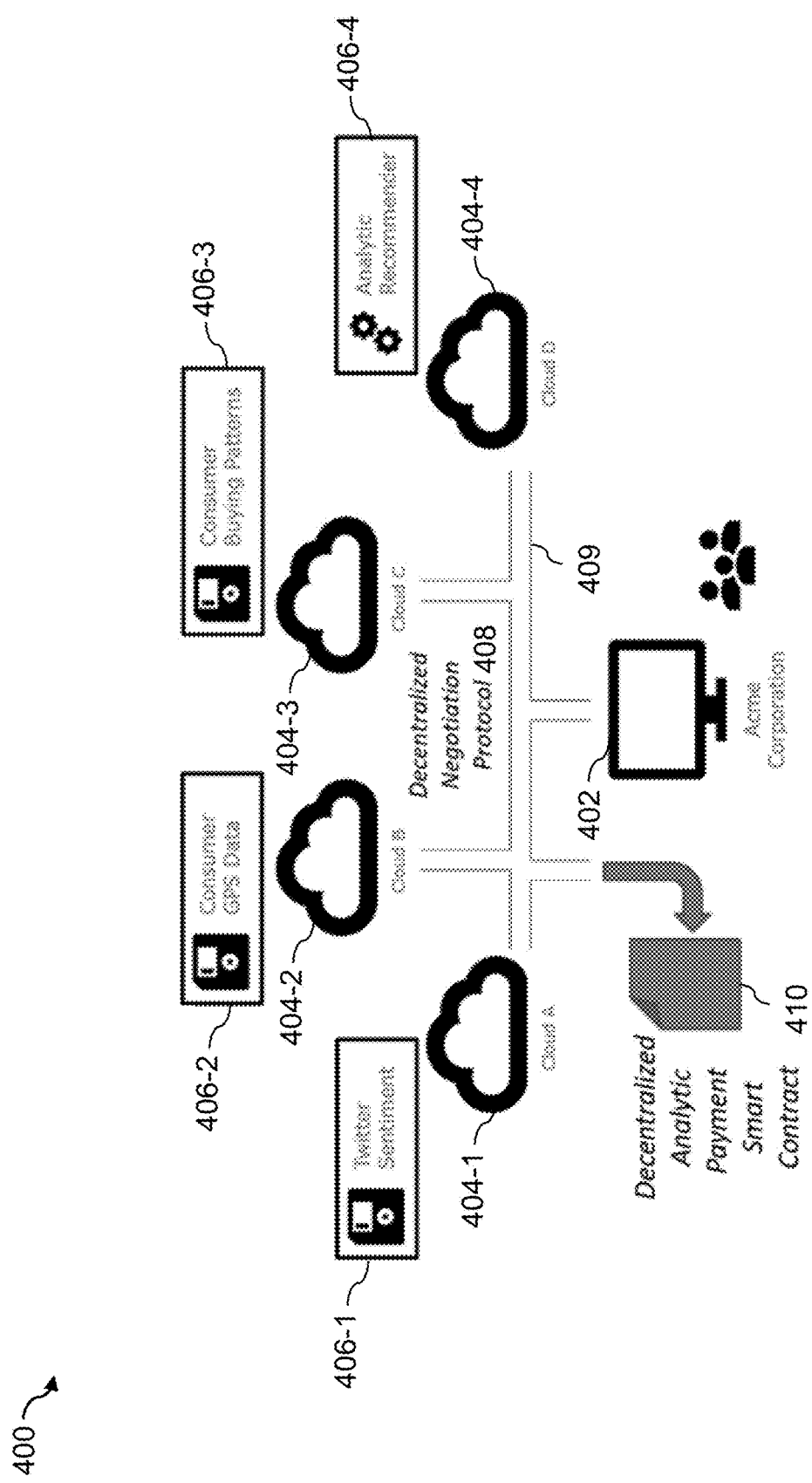
FIG. 4 illustrates decentralized analytic payment smart contract generation according to an illustrative embodiment.

FIG. 4 illustrates decentralized analytic payment smart contract generation 400 according to an illustrative embodiment. For example, the smart contract can specify terms between an enterprise (Acme Corporation via computing system 402) and multiple cloud providers for the execution of an analytic algorithm on one or more data sets. More particularly, as shown in FIG. 4, data sets include data set 406-1 stored on cloud 404-1 (Cloud A), data set 406-2 stored on cloud 404-2 (Cloud B), and data set 406-3 stored on cloud 404-3 (Cloud C). Similar to the example in FIG. 1, data set 406-1 represents data pertaining to social media sentiment; data set 406-2 represents data pertaining to consumer GPS information; and data set 406-3 represents data pertaining to consumer buying patterns. Analytic recommender algorithm 406-4 is hosted on cloud 404-4 (Cloud D). The enterprise seeks to run analytic recommender algorithm 406-4 on data sets 406-1, 406-2 and 406-3 to attempt to realize additional value. For example, analytic recommender algorithm 406-4, in some embodiments, takes social media sentiment (data set 406-1), consumer GPS information (data set 406-2), and consumer buying patterns (data set 406-3), analyzes the data, and generates one or more business recommendations for increasing revenue.

However, in contrast to existing systems, illustrative embodiments employ a decentralized negotiation protocol 408, executed over a decentralized negotiation bus 409, to generate a decentralized analytic payment smart contract 410 that defines the payment terms of executing analytic recommender algorithm 406-4 on data sets 406-1, 406-2 and 406-3. Illustrative details of the decentralized negotiation protocol 408 will be further explained below in the context of FIGS. 5-7.

Figure 5:
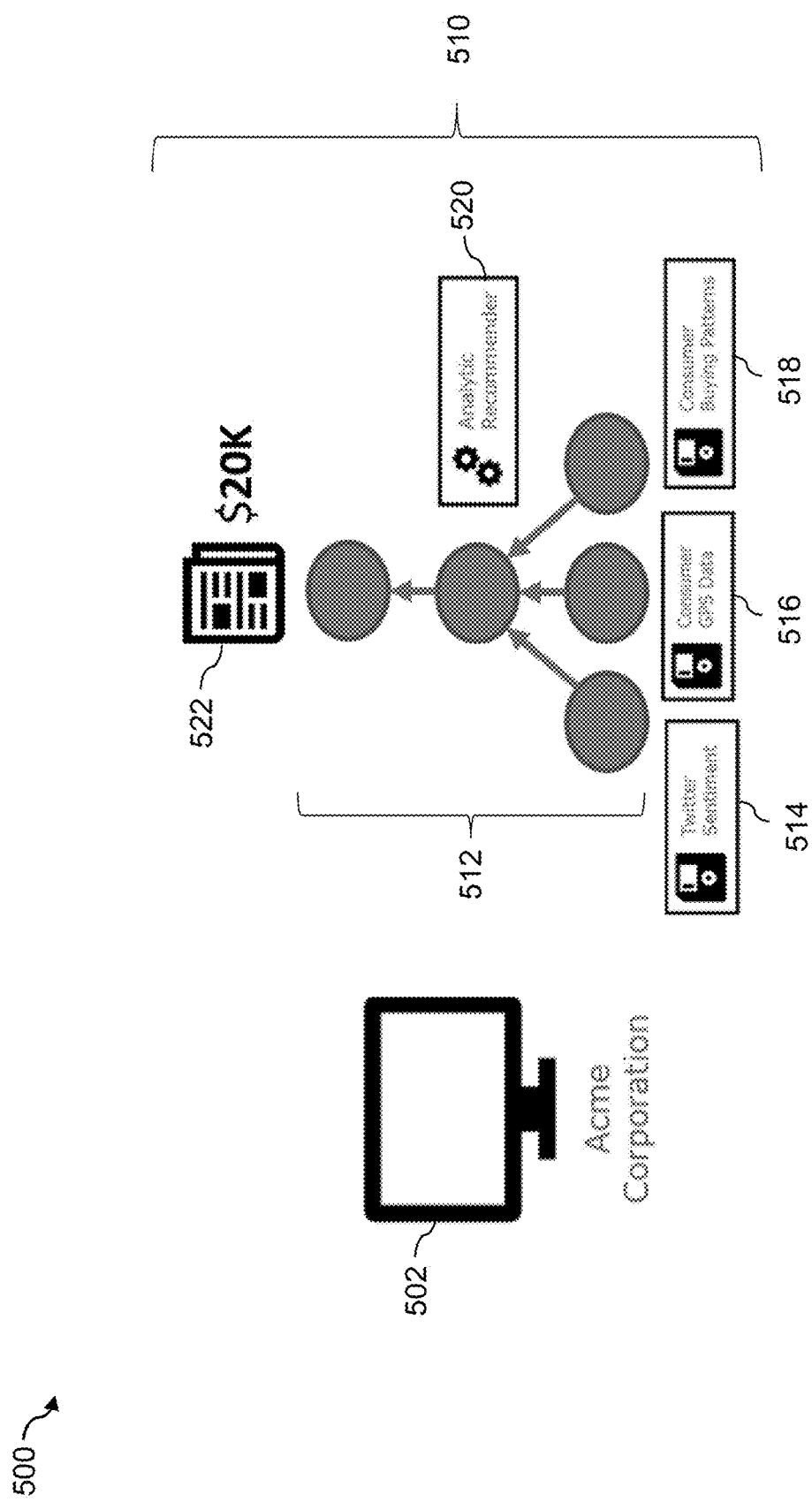
FIG. 5 illustrates multi-cloud analytic payment request creation according to an illustrative embodiment.

In illustrative embodiments, an enterprise creates a request that describes the desired data inputs that would feed the analytic recommender. In some embodiments, the request includes the total value (e.g., a dollar amount, or a cryptocurrency amount) that the enterprise is willing to pay for the end result (e.g., the output of the analytic recommender). FIG. 5 illustrates multi-cloud analytic payment request creation 500 according to an illustrative embodiment. In this embodiment, creation of the request is in the form of a graph.

More particularly, as shown, computing system 502 (enterprise) generates a multi-party analytic request 510 in the form a graph structure 512. The graph structure 512 comprises nodes that represent the data sets of interest, i.e., social media sentiment data set 514, consumer GPS data set 516, and consumer buying patterns data set 518, and that represent the analytic algorithm to be run on the data sets, i.e., analytic recommender algorithm 520. Recall from FIG. 4 that these data sets and analytic algorithm are each stored on different clouds (Cloud A through D), thus there are multiple cloud providers (parties) that need to be involved in such a transaction. In addition to describing all the input(s) and algorithm(s) that the enterprise wishes to leverage across multiple clouds, the request 510 includes a node in the graph structure 512 that describes how much the enterprise is willing to pay for the end result, i.e., price 522 is set at $20K. The nodes of the graph structure 512 are connected to illustrate the requested analytic transaction.

Note that a monetary price (e.g., in the form of cryptocurrency exchanged between respective electronic wallets of the parties) is one form of compensation that may be provided to one or more of the clouds involved in the analytic transaction. In alternative embodiments, other forms of compensation (e.g., computing resource and/or data exchange, or other non-monetary benefits/reimbursements) may be provided.

It is to be appreciated that the use of a graph (512) allows the enterprise to build multiple layers of analytics (e.g., the topmost result could instead be fed to further algorithms to produce a final result). Instead of a graph, in alternative embodiments, one or more other constructs can be used (e.g., an XML file, or an actual smart contract language construct).

Note that the nodes 514, 516, 518, and 520 respectively include references to the actual data inputs and algorithms. In some embodiments, these references are names (e.g., "Cloud A Twitter Sentiment") and/or content addresses (unique hash values representing the content of each file).

Note also that the enterprise, in the FIG. 5 embodiment, is only specifying payment for the final result. Other embodiments include specifying payments for every node in the graph (e.g., informing Clouds A through D that the enterprise will pay $5K apiece to each entity in order to produce the result).

Further, in certain embodiments, the nodes in graph structure 512 contain information (i.e., conditions) from the enterprise that essentially states that the enterprise is not interested in owning any of the three input data sets or the analytic recommender algorithm. Such information can justify the request including a lower price ($20K) than has otherwise been advertised by any of the clouds for their individual assets.

Still further, in some embodiments, the enterprise includes rationale in a node of the graph structure 512 for the request price (e.g., $20K). By way of example only, such rationale may include a descriptive algorithm, or it may include a list of historical prices that have been paid for similar types of analytic jobs.

Figure 6:
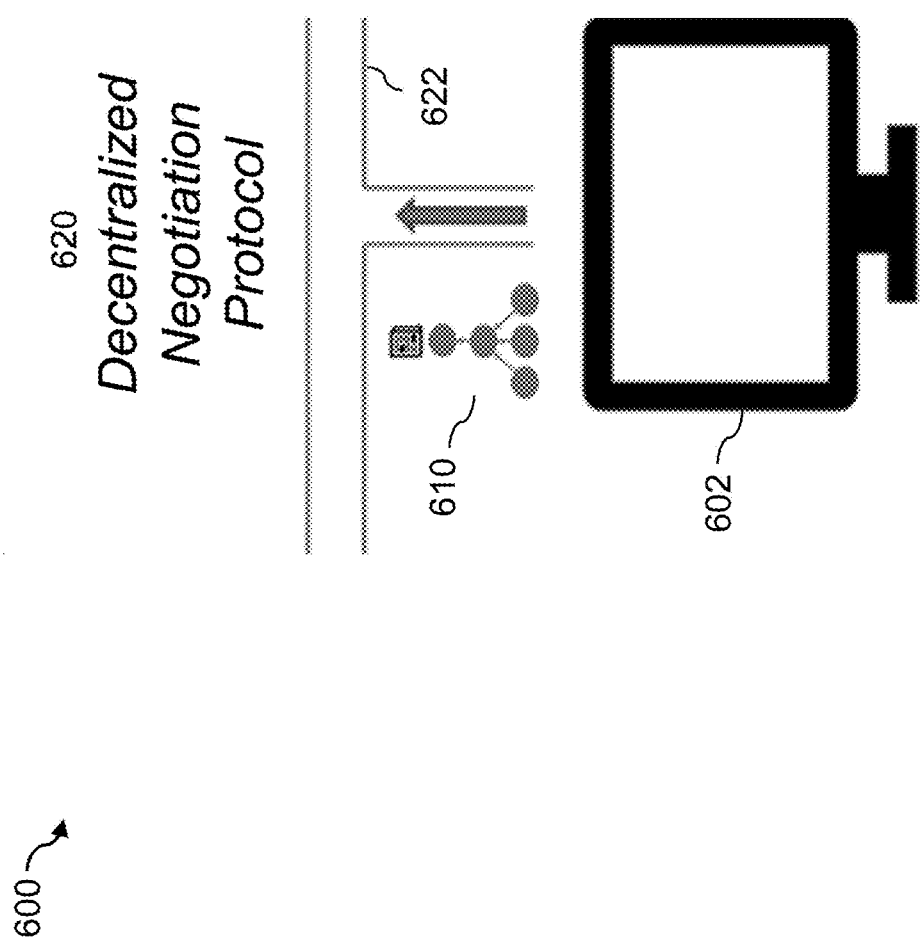
FIG. 6 illustrates multi-cloud analytic payment request publication according to an illustrative embodiment.

Once the enterprise has created a request (e.g., as shown in FIG. 5), the enterprise publishes the request to a decentralized negotiation bus that is facilitating execution of the decentralized negotiation protocol. FIG. 6 illustrates multi-cloud analytic payment request publication 600 according to an illustrative embodiment. As shown, computing system 602 of the enterprise (that created the request) publishes request 610 as per decentralized negotiation protocol 620 onto decentralized negotiation bus 622. Recall in FIG. 4 that a full view of the decentralized negotiation bus (409) is shown connecting the computing system of the enterprise and the various clouds (e.g., Clouds A through D) involved in the negotiation. In illustrative embodiments, the decentralized negotiation bus is established over one or more private and/or public communications networks using one or more appropriate communication protocols.

In accordance with various illustrative embodiments, request publication can be performed in a variety of ways. In one embodiment, the request 610 is published to a blockchain that is accessible to all clouds involved in the negotiation. In some embodiments, the request 610 is entered in a different type of distributed ledger that only allows specific clouds to see the request. Still further, in other embodiments, the enterprise (computing system 602) opens up network connections directly to the clouds that are specified in the transaction. Similarly, in alternative embodiments, the request is sent directly to a subset of the clouds specified within the request. For example, the request 610 can be sent to the topmost node (Cloud D, the owner of the analytic recommender algorithm). In illustrative embodiments, the selection for the method of publication of the request is dependent on another feature, i.e., the protocol for handling payment requests.

When an analytic payment request (610) is published, the clouds that are involved with the request (e.g., Clouds A through D), and the requestor (computing system 602 of the enterprise), begin messaging with each other to negotiate a price. This can be accomplished in a number of different ways.

For example, in one embodiment, a top-level cloud (e.g., Cloud D upon which the analytic recommender algorithm is executed) controls the negotiation. In such a scenario, this top-level cloud may decide the bid (in the request) is too low and it may then publish a counter-offer. Alternatively, the top-level cloud may communicate with the data input clouds (e.g., Clouds A-C) and present a price to them for the use of their data sets, wait for their responses, and then communicate back to the requestor (computing system 602). Alternatively, all nodes may bargain simultaneously and counter (or accept) the requestor's bid.

This negotiation chatter may be accomplished in any number of ways according to various embodiments, e.g., via a blockchain (which can also provide a history of the negotiation), via peer-to-peer networking techniques, or via direct communication between clouds. The end result of the chatter is either: (i) a rejection of the request; or (ii) a negotiated agreement (e.g., 410 in FIG. 4) made by all parties.

Figure 7:
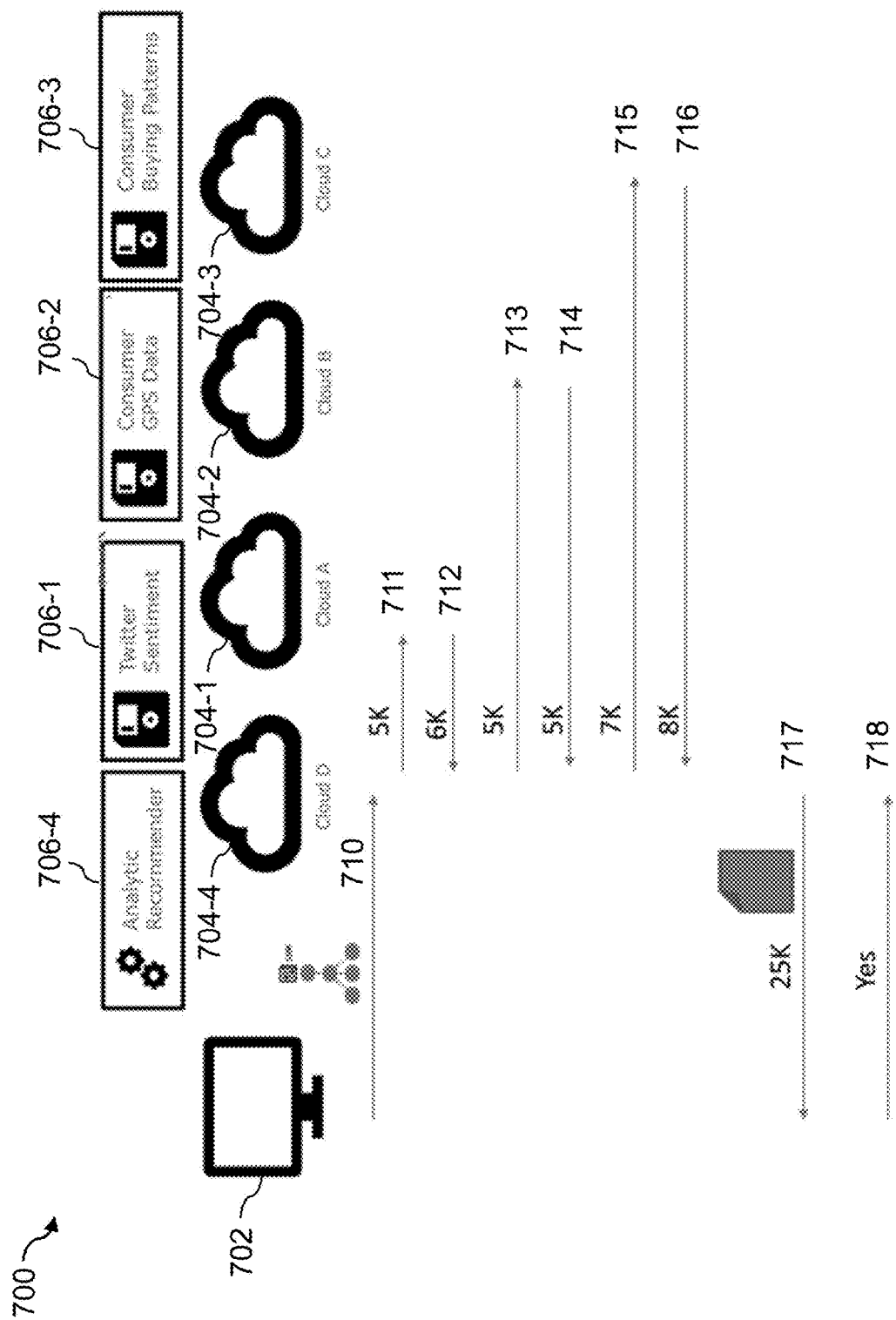
FIG. 7 illustrates analytic payment negotiation according to an illustrative embodiment.

Following the above-described request and publishing operations, a smart contract is created based on the negotiation protocol. FIG. 7 illustrates this step as part of analytic payment negotiation 700 according to an illustrative embodiment. As shown, computing system 702 represents the enterprise which creates and publishes a request to the decentralized negotiation bus connected to a set of clouds 704-1 through 704-4 (Clouds A through D) which respectively host data sets 706-1 through 706-3 and analytic recommender algorithm 706-4 (similar to the data sets and analytic algorithm described above). Note that each of computing system 702 and the set of clouds 704-1 through 704-4 are configured to participate in the decentralized negotiation protocol described herein.

The event flow is depicted via steps 710 through 718 in FIG. 7 according to an illustrative embodiment. The enterprise (computing system 702) publishes the request and the proposed price of $20K (step 710) to Cloud D (the analytic recommender). Cloud D then negotiates directly with the other three clouds (Clouds A through C), offering each a price for the use of their data, and then receiving a counter-offer or acceptance of that price. For example, in step 711, Cloud D offers $5K to Cloud A for the use of data set 706-1. However, Cloud A counter-offers for $6K in step 712. Similar, offering and counter-offering or acceptance between Cloud D and Clouds B and C occur in steps 713, 714, 715 and 716 as shown.

The end result is the creation of a smart contract which defines the payment of a new price ($25K). The smart contract is provided by Cloud D to computing system 702 in step 717, and accepted by the enterprise in step 718. In illustrative embodiments, the smart contract defines the breakdown of payments across all four clouds. This breakdown may specify that one cloud (Cloud D) is paid $25K (by computing system 702), and this cloud in turn distributes that payment to the rest of the clouds (Clouds A-C). Alternatively, computing system 702 may pay each cloud directly.

In some embodiments, the smart contract (agreed upon in steps 717 and 718) contains one or more back pointers that trace each negotiation step (e.g., steps 711 through 716) that occurred as part of the protocol.

Note that in step 718, computing system 702 responds "yes" to denote acceptance of the smart contract. In certain embodiments, this response may occur via a message. In other embodiments, acceptance may occur by the requestor (computing system 702) publishing the smart contract to a blockchain or other distributed ledger, at which point it is validated and accepted by all parties (and potentially other nodes as well) involved in the transaction.

Note that, in various embodiments, the smart contract may specify that execution starts only after the full funds are transferred, or a down payment (to one or more parties) may be specified, or no payment at all may be made until after the entire transaction is complete.

The execution of the smart contract involves Clouds A, B, and C transferring their data set to Cloud D in some fashion (e.g., file transfer protocol or FTP, or making it available via an application programming interface or API). Encryption may or may not be used according to the particular embodiment. Cloud D would then perform the analysis and create a recommender result. This recommender result is sent to the requestor (or to another algorithm, if the original graph had specified that intermediate results be fed to yet another algorithm) in illustrative embodiments, and the final stages of the smart contract trigger the payment of cryptocurrencies to the parties (assuming one or more parties have not already been paid).

In some embodiments, Cloud D provides conclusive proof that it did indeed dedicate compute resources during the specific time frame that the smart contract was executed (i.e., provide proof-of-resources). In one embodiment, this proof is provided by giving a receipt in the form of a content address that points to a record of the resources used by Cloud D during the transaction. In a blockchain-based embodiment, such a receipt is accessible by all parties via the corresponding distributed ledger.

Figure 8:
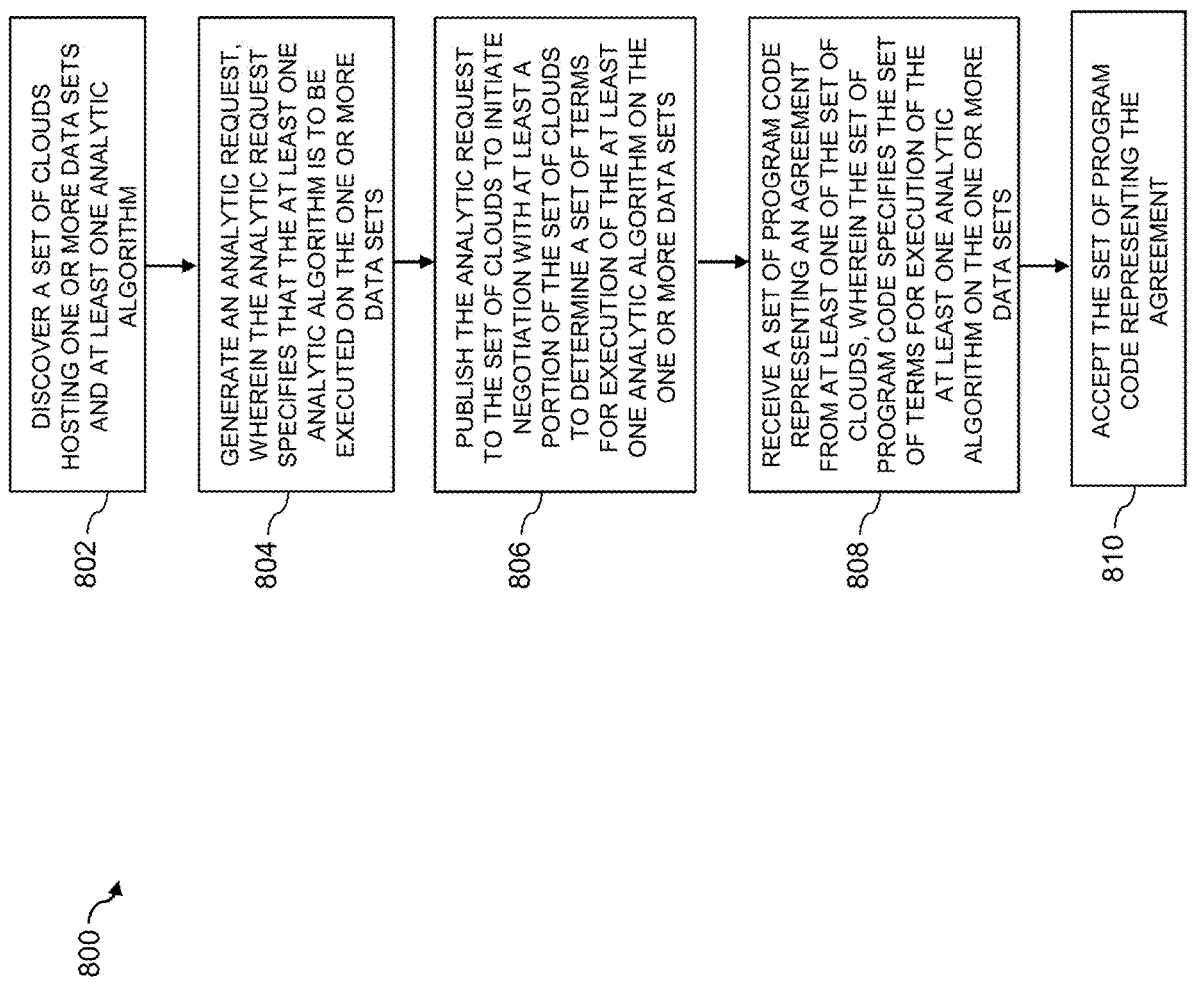
FIG. 8 illustrates a methodology for decentralized data analytics management in an information processing system according to an illustrative embodiment.

FIG. 8 illustrates a methodology 800 for decentralized data analytics management in an illustrative embodiment. As shown, in step 802, the methodology discovers a set of clouds hosting one or more data sets and at least one analytic algorithm. Note that multiple analytic algorithms may be involved in various embodiments, e.g., analytic algorithms can be cascaded such that results from one analytic algorithm are fed as input to one or more other analytic algorithms, and so on. In step 804, an analytic request is generated, wherein the analytic request specifies that the at least one analytic algorithm is to be executed on the one or more data sets. In step 806, the analytic request is published to the set of clouds to initiate negotiation with at least a portion of the set of clouds to determine a set of terms for execution of the at least one analytic algorithm on the one or more data sets. In step 808, a set of program code representing an agreement (e.g., smart contract) is received from at least one of the set of clouds, wherein the set of program code specifies the set of terms for execution of the at least one analytic algorithm on the one or more data sets. In step 810, the set of program code representing the agreement is accepted. Advantageously, execution of the at least one analytic algorithm on the one or more data sets proceeds according to the set of program code representing the agreement.

At least portions of the architecture of information processing systems described herein may be implemented using one or more processing platforms. Illustrative embodiments of such platforms will now be described in greater detail in conjunction with FIGS. 9 and 10.

Figure 9:
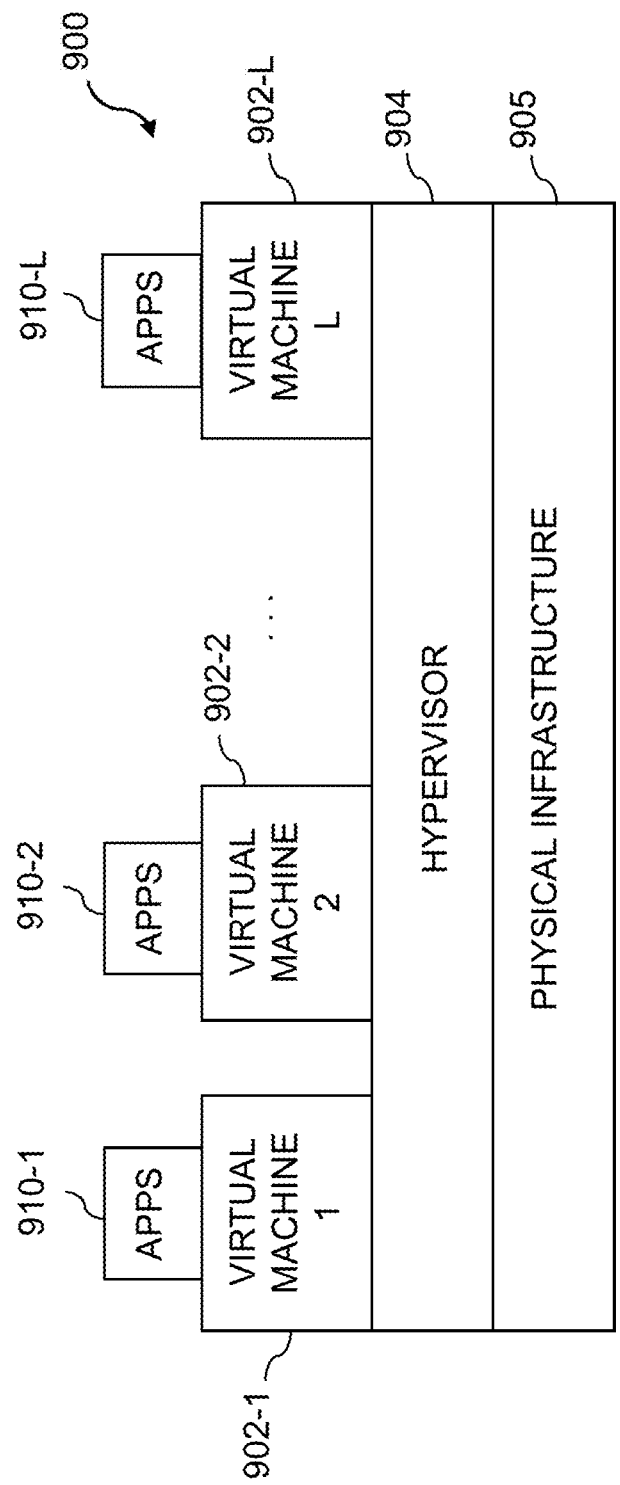
FIGS. 9 and 10 show examples of processing platforms that may be utilized to implement at least a portion of an information processing system in illustrative embodiments.
Figure 10:
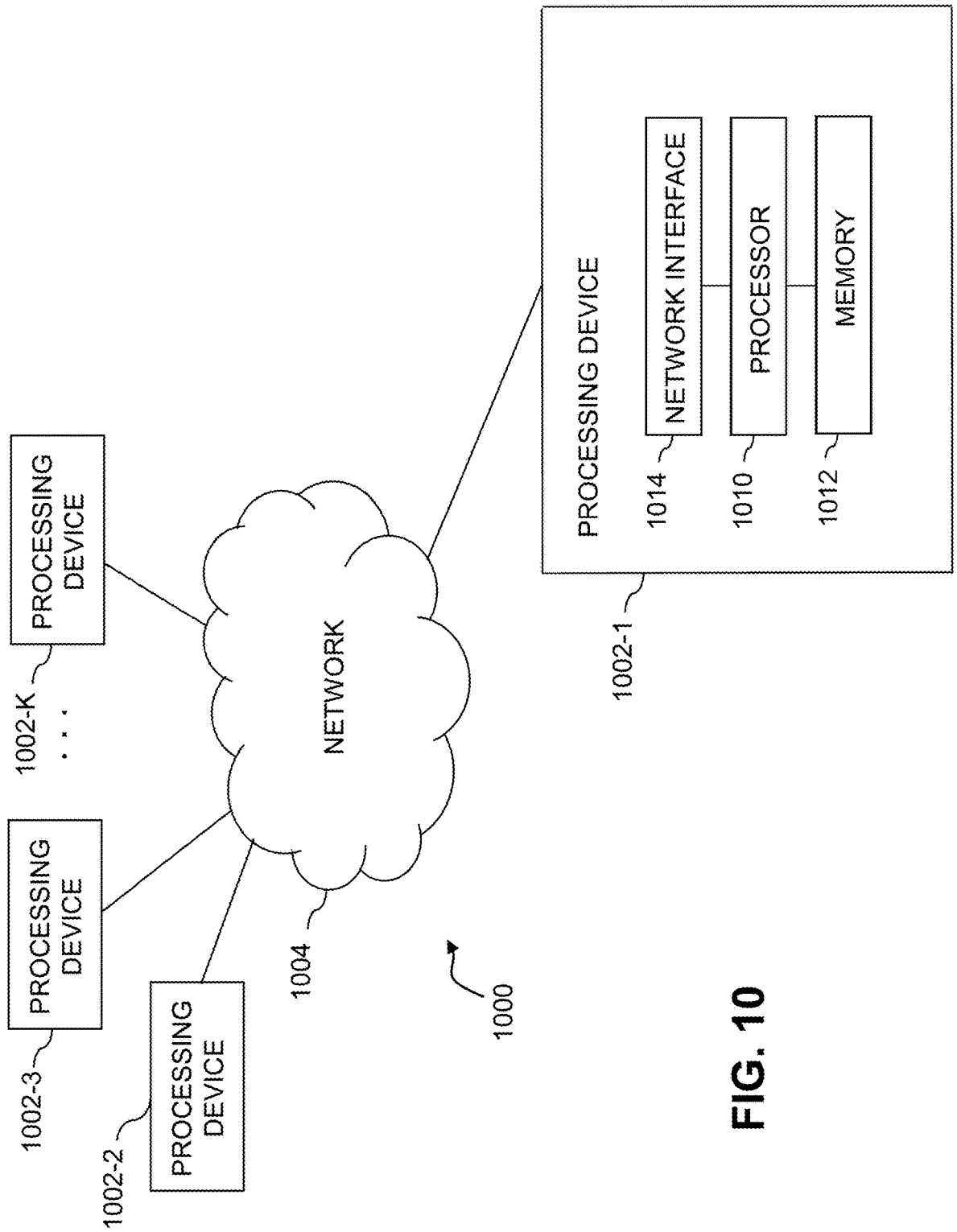

FIG. 9 shows an example processing platform comprising cloud infrastructure 900. The cloud infrastructure 900 comprises a combination of physical and virtual processing resources that may be utilized to implement at least a portion of the information processing systems 100, 200, and 300. The cloud infrastructure 900 comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

These and other types of cloud infrastructure can be used to implement one or more system components/steps, such as the components/steps shown in FIGS. 1-8.

Although only a single hypervisor 904 is shown in the embodiment of FIG. 9, the information processing systems may of course include multiple hypervisors each providing a set of virtual machines using at least one underlying physical machine. Different sets of virtual machines provided by one or more hypervisors may be utilized in configuring multiple instances of various components of the information processing systems.

An example of a commercially available hypervisor platform that may be used to implement hypervisor 904 and possibly other portions of the information processing systems in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

More specifically, some embodiments can comprise a storage system implemented using DAS configurations comprising local hard drives in respective servers. Such a storage system may additionally or alternatively comprise specialized high-performance flash storage such as DSSD™ accessible via Peripheral Component Interconnect Express (PCIe) connections. Numerous other configurations are possible for a given storage system or other related components of the information processing systems.

As is apparent from the above, one or more of the processing modules or other components of the information processing systems illustrated in the figures and otherwise described above may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of the information processing systems and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks. Some networks utilized in a given embodiment may comprise high-speed local networks in which associated processing devices communicate with one another utilizing PCIe cards of those devices, and networking protocols such as InfiniBand, Gigabit Ethernet or Fibre Channel.

The processing device 1002-1 in the processing platform 1000 comprises a processor 1010 coupled to a memory 1012. The processor 1010 may comprise a microprocessor, a microcontroller, an application-specific integrated circuit (ASIC), a field-programmable gate array (FPGA) or other type of processing circuitry, as well as portions or combinations of such circuitry elements. The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionalities. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from Dell EMC. For example, portions of a value-based governance system of the type disclosed herein can be implemented utilizing converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing systems described herein. Such components can communicate with other elements of an information processing system over any type of network or other communication media.

As indicated previously, components of an information processing system as disclosed herein can be implemented at least in part in the form of one or more software programs stored in memory and executed by a processor of a processing device. For example, at least portions of ledger nodes, a blockchain distributed ledger, clouds, valuation algorithms, protocols, FTPs, APIs, or other component of an information processing system are illustratively implemented in one or more embodiments the form of software running on a processing platform comprising one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing device operatively coupled to a set of clouds, wherein the at least one processing device comprises a processor operatively coupled to a memory and is configured to:
   generate an analytic request, wherein the analytic request specifies one or more data sets and at least one analytic algorithm to be executed on the one or more data sets, and wherein the one or more data sets and the at least one analytic algorithm are hosted on the set of clouds;
   publish the analytic request to the set of clouds to initiate negotiation with at least a portion of the set of clouds to determine a set of terms for execution of the at least one analytic algorithm on the one or more data sets; and
   receive a set of program code representing an agreement from at least one of the set of clouds, wherein the set of program code specifies the set of terms for execution of the at least one analytic algorithm on the one or more data sets, wherein the set of terms comprises a compensation to provide one or more of the set of clouds for execution of the at least one analytic algorithm on the one or more data sets, and further wherein the set of terms comprises a schedule for compensation associated with execution of the at least one analytic algorithm on the one or more data sets.

2. The apparatus of claim 1, wherein the at least one processing device is further configured to exchange one or more messages with one or more of the set of clouds during negotiation to determine the set of terms for execution of the at least one analytic algorithm on the one or more data sets.

3. The apparatus of claim 1, wherein the at least one processing device is further configured to accept the set of program code representing the agreement.

4. The apparatus of claim 1, wherein the at least one processing device is further configured to discover the set of clouds prior to generating the analytic request.

5. The apparatus of claim 1, wherein the at least one processing device is further configured to communicate with a blockchain node as part of a distributed ledger comprising other blockchain nodes associated with the set of clouds.

6. The apparatus of claim 1, wherein the analytic request comprises unique references to the one or more input data sets and the at least one analytic algorithm.

7. The apparatus of claim 1, wherein the analytic request comprises information indicative of at least one of a condition and a rationale regarding the negotiation.

8. The apparatus of claim 1, wherein the analytic request is in the form of a graph structure comprising nodes that correspond to the one or more input data sets and the at least one analytic algorithm.

9. The apparatus of claim 8, wherein the graph structure further comprises a node that specifies a proposed compensation for execution of the at least one analytic algorithm on the one or more data sets.

10. A method comprising:
    generating an analytic request, wherein the analytic request specifies one or more data sets and at least one analytic algorithm to be executed on the one or more data sets, and wherein the one or more data sets and the at least one analytic algorithm are hosted on a set of clouds;
    publishing the analytic request to the set of clouds to initiate negotiation with at least a portion of the set of clouds to determine a set of terms for execution of the at least one analytic algorithm on the one or more data sets; and
    receiving a set of program code representing an agreement from at least one of the set of clouds, wherein the set of program code specifies the set of terms for execution of the at least one analytic algorithm on the one or more data sets, wherein the set of terms comprises a compensation to provide one or more of the set of clouds for execution of the at least one analytic algorithm on the one or more data sets, and further wherein the set of terms comprises a schedule for compensation associated with execution of the at least one analytic algorithm on the one or more data sets;

wherein the steps are performed by at least one processing device operatively coupled to the set of clouds, wherein the at least one processing device comprises a processor operatively coupled to a memory.

11. The method of claim 10, further comprising exchanging one or more messages with one or more of the set of clouds during negotiation to determine the set of terms for execution of the at least one analytic algorithm on the one or more data sets.

12. The method of claim 10, further comprising accepting the set of program code representing the agreement.

13. An article of manufacture comprising a non-transitory processor-readable storage medium having stored therein one or more software programs, wherein the one or more software programs when executed by the at least one processing device causes the processing device to perform the steps of claim 10.

14. A method comprising:
   obtaining an analytic request at a given cloud node in a set of clouds from a requesting processing device, wherein the analytic request specifies one or more data sets and at least one analytic algorithm to be executed on the one or more data sets, and wherein the one or more data sets and the at least one analytic algorithm are hosted on the set of clouds;
   performing a negotiation with one or more other cloud nodes in the set of clouds to determine a set of terms for execution of the at least one analytic algorithm on the one or more data sets; and
   sending a set of program code representing an agreement from the given cloud node to the requesting processing device, wherein the set of program code specifies the set of terms for execution of the at least one analytic algorithm on the one or more data sets, wherein the set of terms comprises a compensation to provide one or more of the set of clouds for execution of the at least one analytic algorithm on the one or more data sets, and further wherein the set of terms comprises a schedule for compensation associated with execution of the at least one analytic algorithm on the one or more data sets;
   wherein the steps are performed by at least one processing device of the given cloud node, wherein the at least one processing device comprises a processor operatively coupled to a memory.

15. The method of claim 14, further comprising exchanging one or more messages with the one or more other cloud nodes during negotiation to determine the set of terms for execution of the at least one analytic algorithm on the one or more data sets.

16. The method of claim 15, wherein the one or more messages exchanged comprise one or more of offers and counter-offers relating to the set of terms for execution of the at least one analytic algorithm on the one or more data sets.

17. The method of claim 15, wherein the analytic request comprises unique references to the one or more input data sets and the at least one analytic algorithm.

18. The method of claim 15, wherein the analytic request comprises information indicative of at least one of a condition and a rationale regarding the negotiation.

19. The method of claim 15, wherein the analytic request is in the form of a graph structure comprising nodes that correspond to the one or more input data sets and the at least one analytic algorithm.

20. The method of claim 19, wherein the graph structure further comprises a node that specifies a proposed compensation for execution of the at least one analytic algorithm on the one or more data sets.

* * * * *